US009478956B1

(12) United States Patent
Elbaz et al.

(10) Patent No.: US 9,478,956 B1
(45) Date of Patent: Oct. 25, 2016

(54) IN USE COVER FOR OUTDOOR ELECTRICAL DEVICES

(71) Applicants: Michael Elbaz, New York, NY (US); Edna Elbaz, New York, NY (US); Gil H. Elbaz, Belle Harbor, NY (US)

(72) Inventors: Michael Elbaz, New York, NY (US); Shimon Elbaz, Neponsit, NY (US); Gil H. Elbaz, Belle Harbor, NY (US)

(73) Assignee: Superflex, Ltd, Brooklyn, NY (US)

( * ) Notice: Subject to any disclaimer, the term of this patent is extended or adjusted under 35 U.S.C. 154(b) by 0 days.

(21) Appl. No.: 14/838,090

(22) Filed: Aug. 27, 2015

(51) Int. Cl.
*H02G 3/14* (2006.01)
*H02G 3/08* (2006.01)

(52) U.S. Cl.
CPC ............. *H02G 3/088* (2013.01); *H02G 3/081* (2013.01); *H02G 3/14* (2013.01)

(58) Field of Classification Search
CPC .... H05K 5/0239; H05K 5/0226; H05K 5/03; H05K 5/06; H05K 5/0247; H05K 5/069; H02G 3/14; H02G 3/081; H02G 3/18; H02G 3/088; H02G 3/083; H02G 3/085; H02B 1/305
USPC ....... 174/66, 67, 53–55, 480, 481, 520, 535, 174/560, 564, 50.5, 50.51, 50.52, 65 G; 439/135, 142, 136; 220/3.2–3.9, 241, 220/242
See application file for complete search history.

(56) References Cited

U.S. PATENT DOCUMENTS

| 5,531,345 | A | * | 7/1996 | Nakamura | ............... | H02G 3/14 |
| | | | | | | 220/3.8 |
| 6,133,531 | A | * | 10/2000 | Hayduke | ............... | H02G 3/081 |
| | | | | | | 174/67 |
| 6,979,777 | B2 | * | 12/2005 | Marcou | .................... | H02G 3/14 |
| | | | | | | 174/50 |
| 7,241,952 | B2 | | 7/2007 | Dinh | | |
| 7,915,528 | B2 | | 3/2011 | Ni | | |
| 8,106,295 | B1 | | 1/2012 | Shotey | | |
| 8,586,864 | B1 | * | 11/2013 | Shotey | ..................... | H02G 3/14 |
| | | | | | | 174/53 |
| 2003/0000726 | A1 | * | 1/2003 | Miyakoshi | ............. | H02G 3/081 |
| | | | | | | 174/650 |
| 2004/0144556 | A1 | * | 7/2004 | Dinh | ....................... | H02G 3/14 |
| | | | | | | 174/67 |
| 2009/0071681 | A1 | * | 3/2009 | Junjie | .................... | H02G 3/088 |
| | | | | | | 174/66 |

\* cited by examiner

*Primary Examiner* — Dimary Lopez Cruz
(74) *Attorney, Agent, or Firm* — Seth Natter; Natter & Natter

(57) ABSTRACT

An outdoor electrical device cover includes a lid having top, bottom and side walls with a laterally projecting flange having a peripheral skirt. A continuous channel is formed between the skirt and an inner rail of the lid flange. The lid is hinged to a base which includes top, bottom and side walls having a peripheral flange with a continuous channel. When the lid is closed, an inner rail of the lid flange seats in the base channel and an outer rail of the base flange seats in the lid channel to seal the electrical device from water penetration. At least one frangible panel provided in a wall of the lid is broken away to open a portal for an electric cord passageway into the interior of the cover when the lid is closed. A canopy arch flange overlies the passageway to shield against water entering through the open passageway.

10 Claims, 4 Drawing Sheets

IN USE COVER FOR OUTDOOR ELECTRICAL DEVICES

BACKGROUND OF THE INVENTION

1. Field of the Invention

This invention relates generally to outdoor electrical device covers and more particularly to a water resistant in use cover having a lid with an electric cord passageway.

2. Antecedents of the Invention

In use electrical device covers have been configured to provide a portal form an electric cord with the goal of maintaining the cover interior, including the electrical device and the connection between the electrical device and the cord, free of water and moisture contamination.

Portals into the interior were generally positioned at the bottom of the cover, so that rain, melting or blown snow and other sources of moisture contamination would fall or drip downwardly, away from the interior. There was no assurance, however, that wind gusts. etc., would not result in the entrance of water, with potentially hazardous consequences.

Additional challenges were presented when the in use covers were adaptable for either vertically or horizontally mounted electric boxes. Provision for cord passageways were then required on two orthogonal surfaces of the cover, with the selected passageway oriented at the bottom. The unused side passageway was subject to water, snow and ice penetration, even though it might be covered by a knock out segment.

SUMMARY OF THE INVENTION

The present invention is directed to a weatherproof outdoor electrical device cover for shielding and protecting an electrical device from moisture and more particularly to a water resistant in use cover.

The cover includes a base and a lid hinged to the base. The lid includes a laterally projecting peripheral flange having a continuous inwardly facing channel formed between a rail and a skirt. The base includes a peripheral flange with a mating continuous outwardly facing channel formed between a pair of rails. When the lid is closed, an inner rail of the flange seats in the base channel and an outer rail of the base channel seats in the lid channel to provide a water resistant seal.

The lid peripheral flange and an adjacent portion of the lid includes least one frangible segment which is broken away to open a portal for an electric cord passageway into the interior when the lid is closed. A laterally projecting dripstone canopy flange overlies the portal.

From the foregoing compendium, it will be appreciated that an aspect of the present invention is to provide an in use cover for outdoor electrical devices which is not subject to the aforementioned disadvantages of the antecedents of the invention.

A feature of the present invention is to provide an in use cover for outdoor electrical devices which is simple to assemble and easy to use.

A consideration of the present invention is to provide an in use cover for outdoor electrical devices which is well suited for heavy duty applications.

A further aspect of the present invention is to provide an in use cover for outdoor electrical devices which is well suited for economical mass production fabrication.

A still further consideration of the present invention is to provide an in use cover for an outdoor electrical device having a lid hinged to a base with the lid having a panel with a frangible segment configured to be removed to provide a access for an electric cord and with the panel having a flange extending around a portion of the frangible segment to protect against the entrance of rain and snow when the frangible segment is removed.

Another feature of the present invention is to provide an in use cover for outdoor electrical devices which is water resistant.

An additional consideration of the present invention is to provide an in use cover for outdoor electrical devices having a base and a lid wherein interlocking peripheral channels are provided in the base and the lid.

To provide an in use cover for outdoor electrical devices wherein a frangible segment of a lid having an arched canopy is broken away to provide a portal passageway for an electrical cord is a further consideration of the present invention.

Another aspect of the present invention is to provide an in use cover for outdoor electrical devices having a base and a lid wherein interlocking peripheral channels are provided in the base and the lid.

A further feature of the present invention is to provide an in use cover for outdoor electrical devices having a base and a lid wherein the lid includes a laterally projecting peripheral flange with a frangible segment forming a portion of the flange.

Yet another aspect of the present invention is to provide an in use cover for outdoor electrical devices comprising a lid hinged to a base, the lid having bottom panel including an opening for an electric cord to be connected to the outdoor electrical device, the bottom panel having a flange extending around at least a portion of the opening whereby rainwater dripping from the lid will be deflected away from the opening.

A still further consideration of the present invention is to provide an in use cover for outdoor electrical devices wherein all components can be economically molded of weatherproof thermoplastic resins.

Other aspects, features and considerations of the present invention in part will be obvious and in part will be pointed out hereinafter.

With these ends in view, the invention finds embodiment in various combinations of elements, arrangements of parts and series of steps by which the above-mentioned aspects, features and considerations and certain other aspects, features and considerations are attained, or with reference to the accompanying drawings and the scope of which will be more particularly pointed out and indicated in the appended claims.

BRIEF DESCRIPTION OF THE DRAWINGS

In the accompanying drawings, wherein one of the various possible exemplary embodiments of the invention are shown.

DESCRIPTION OF THE PREFERRED EMBODIMENT

Figure 1:
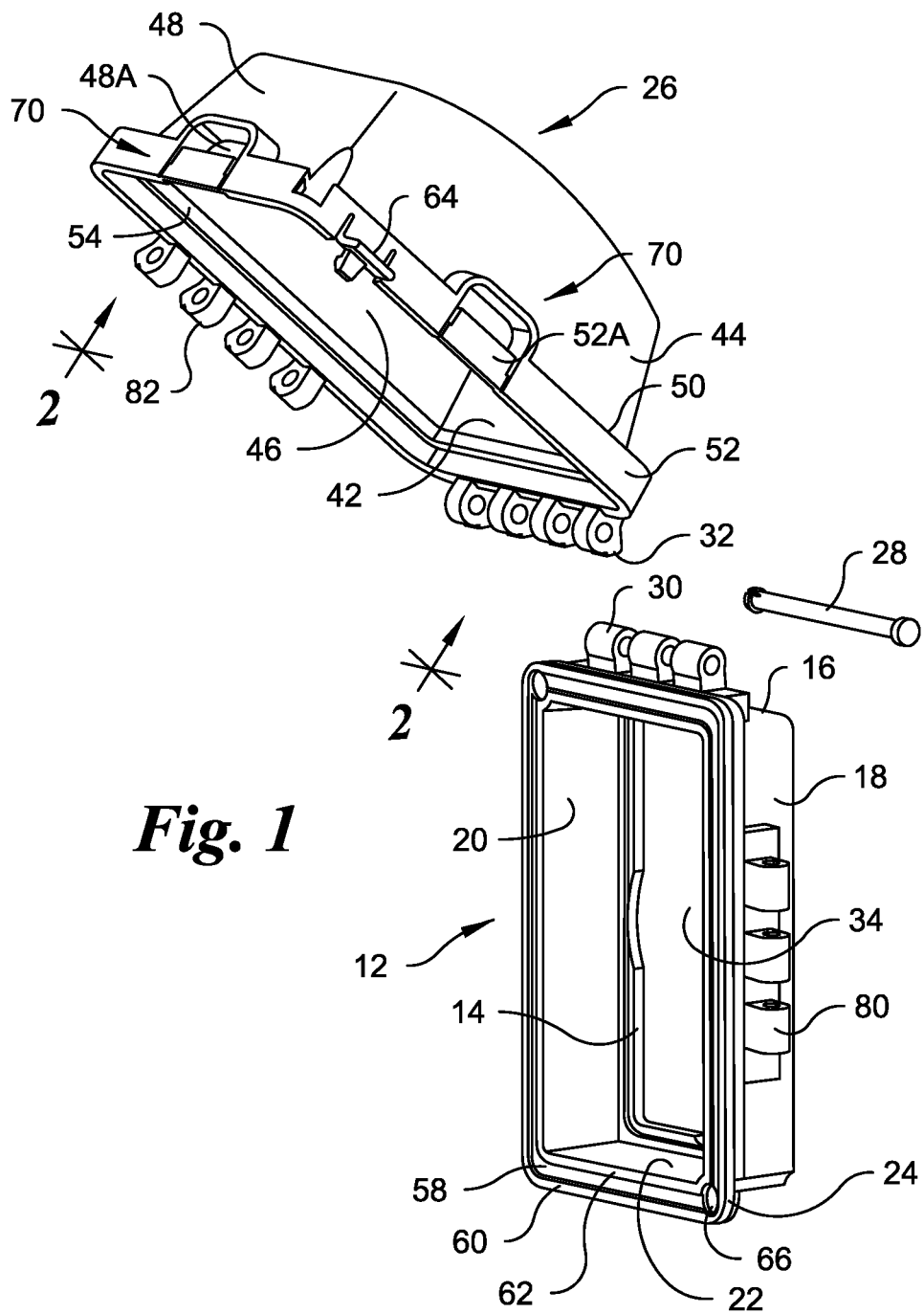
FIG. 1 is an exploded isometric view of an in use electrical device cover t constructed in accordance with and embodying the present invention and showing a base and a lid having a peripheral flange, the cover being oriented for use with a vertically mounted electric box.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements.

Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein.

Moreover, applicants do not intend for any term in the specification or claims to be ascribed an uncommon or special meaning unless explicitly set forth as such. Further, the present invention encompasses present and future known equivalents to the known components referred to herein by way of illustration.

Referring now in detail to the drawings, the reference numeral 10 denotes an in use cover for outdoor electrical devices constructed in accordance with the invention. The cover 10 includes a substantially rectangular base 12 having a rear panel 14, a top panel 16, a right side panel 18, a left side panel 20 and a bottom panel 22. A peripheral flange 24 surrounds the proximal edges of the panels 16, 18, 20 and 22.

A weatherproof lid 26 which may be hinged to either the top panel 16 or the right side panel 18 (if the cover is to be mounted to a horizontally oriented electrical box) is illustrated in FIG. 1 to be hinged to the top panel 16 by way of a hinge pin 28 which extends through registered apertures in sets of hinge knuckles 30, 32. The cover lid and base may each be unitarily molded in one piece construction from any suitable thermoplastic.

It should be noted that the rear panel 14 includes an orifice 34 of generally rectangular shape configured to seat one of a plurality of adapter plates which are configured with openings dimensioned to receive the face of an electrical device being covered or to receive inserts having openings dimensioned to receive the face of an electrical device.

The lid 26 includes a front panel 40, a top panel 42, right and left side panels, 42, 44, and a bottom panel 48. A laterally projecting peripheral flange 50 surrounds the edges of the panels 42, 44, 46 and 48. The flange 50 terminates at a distally projecting peripheral skirt 52. A rail 54 is spaced inwardly from and extends substantially parallel to the skirt 52 with a recessed lid channel 56 formed there between.

A mating recessed channel 58 is formed in the base flange 24 between an outer rail 60 and an inner rail 62. When the lid is closed, the rail 54 of the lid 26 seats in the base channel 58, between the outer rail 60 and the inner rail 62 and the outer rail 60 seats in the lid channel 56 while the skirt 52 overlies the base peripheral flange 24 to provide a water resistant seal.

A flexible latch 64 projects from the lid 26 and includes a fluke which provided through the flanges 24, 50 to lock the lid in a closed position with a padlock.

To provide a portal passageway into the interior of a closed cover for an electric cord to access the electric device, the lid 26 is molded in one piece with a frangible segment 70 formed in the lid end panel 48 and the lid right side panel 44. Projecting laterally from the end panel 48 and side panel 44 is a flange comprising an arched dripstone canopy 72. As may be noted from an examination of FIG. 2, the canopy 72 is continuous with the peripheral flange 50 and defines the top and sides of the segment 70.

The frangible segment 70 extends through the peripheral flange 50, including the skirt 52, the inner rail 54 and the channel 56. The entire segment 70 is of reduced thickness, as compared to the remainder of the lid 26. The segment 70 comprises an end panel portion 48A, which extends to the dripstone canopy 72, a flange portion 50A, a skirt portion 52A, a rail portion 54A and a channel portion 56A. When the lid is closed, the rail portion 54A seats in the base channel 58, between the outer rail 60 and the inner rail 62 and the outer rail 60 seats in the lid channel portion 56A while the skirt portion 52A overlies the base peripheral flange 24 to provide a substantially continuous water resistant seal. The flange portion 50A and the skirt portion 52A include a pair of cut away notches leaving open spaces 74, 76, 74A, 76A, respectively at the lateral ends of the segment 70, which, along with the reduced thickness of the segment 70, facilitate removal.

Figure 2:
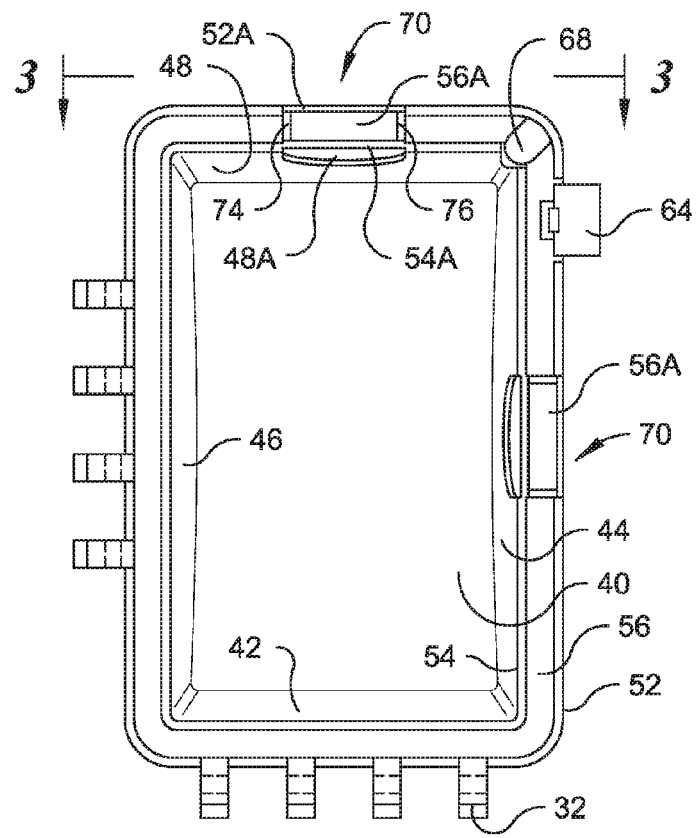
FIG. 2 is an auxiliary view of the interior of the lid, taken along the plane 2-2 of FIG. 1.
Figure 3:
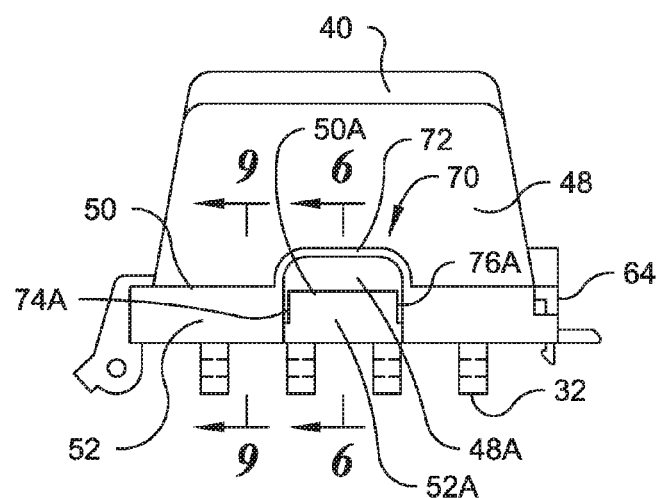
FIG. 3 is an end view of the lid, taken along the plane 3-3 of FIG. 2 and showing a bottom panel with a frangible segment including a portion of the peripheral flange.
Figure 4:
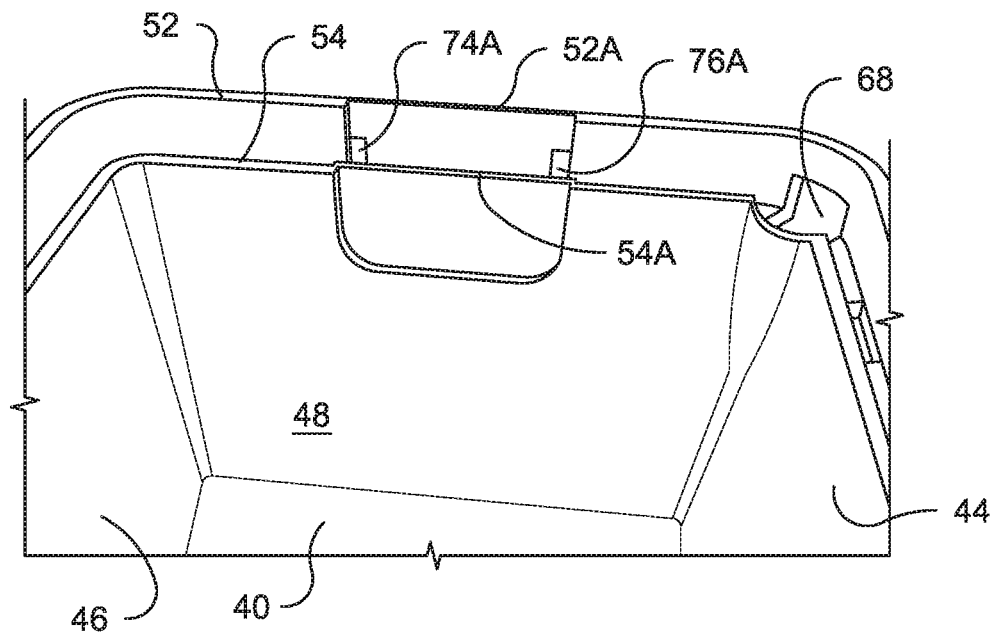
FIG. 4 is a fragmentary isometric view of the lid interior, showing a bottom panel and an inwardly facing channel formed in the peripheral flange.
Figure 5:
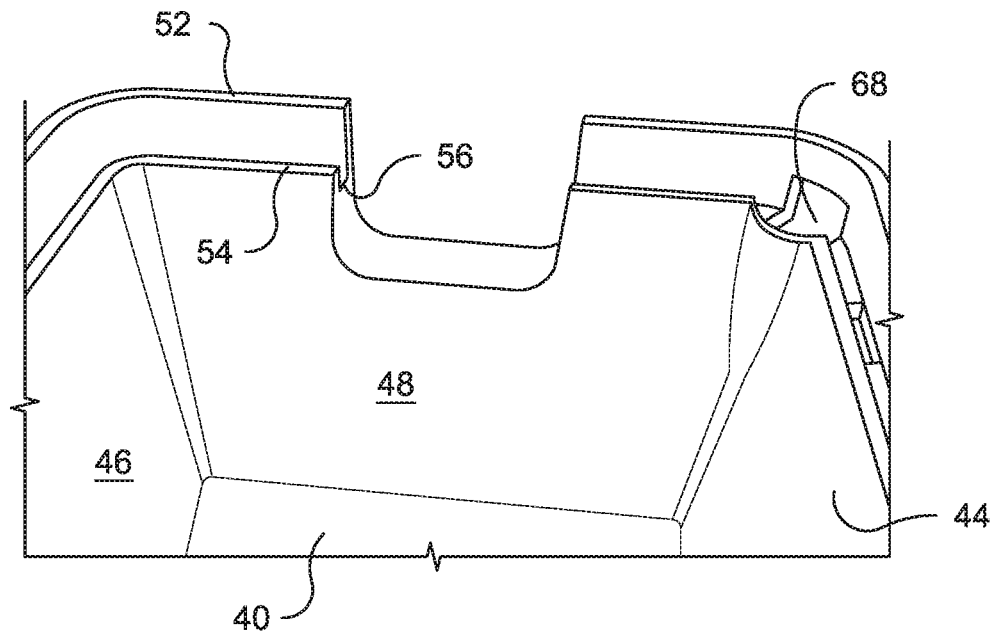
FIG. 5 is a fragmentary isometric view of the lid interior, similar to FIG. 4, but with the frangible segment removed to provide a portal for an electrical cord passageway.
Figure 6:
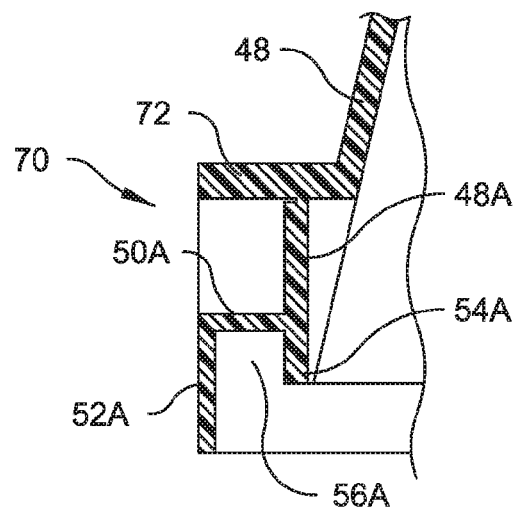
FIG. 6 is an enlarged scale sectional view through the bottom panel taken along the plane 6-6 of FIG. 3, showing details of the frangible segment and a dripstone canopy which extends laterally above the segment.

As will be noted from an examination of FIG. 2 and FIG. 6, since the end panel portion 48A is continuous with the dripstone canopy 72 and the rail portion 54A of the end portion 48A is continuous with the rail 54, any water which may pass through the open notches 74, 76, 74A, 76A is precluded from entry into the interior.

Figure 7:
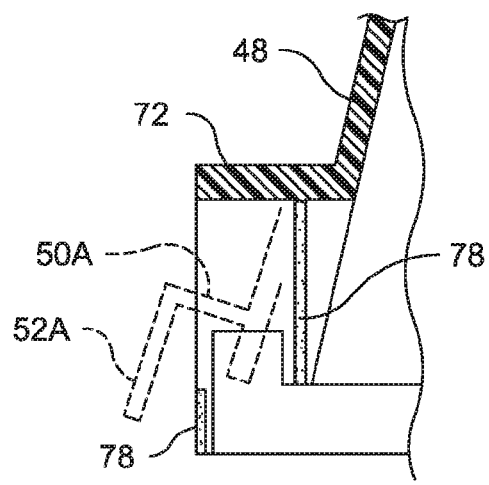
FIG. 7 is an enlarged scale sectional view through the bottom panel similar to FIG. 6, with the frangible segment being removed.
Figure 8:
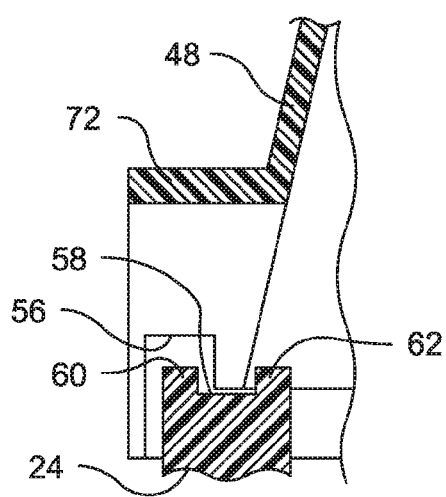
FIG. 8 is an enlarged scale sectional view through the bottom panel similar to FIG. 7, together with a registered portion of the base flange channel when the lid is in a closed position.
Figure 9:
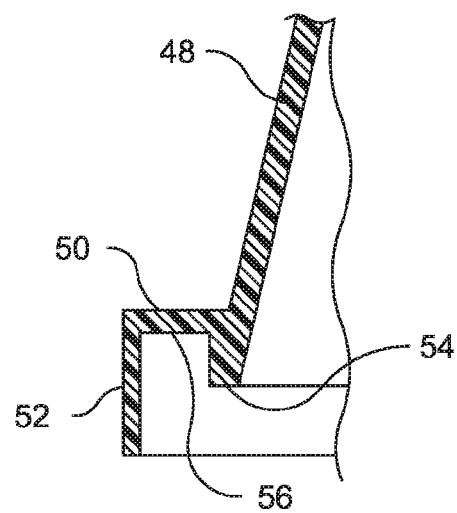
FIG. 9 is an enlarged scale sectional view through the bottom panel similar to FIG. 6, but taken across the plane 9-9 of FIG. 3.

In the event a portal is desired, the segment is removed by bending, as depicted in the dashed lines of FIG. 7 until it snaps away. FIG. 7 also illustrates fracture surfaces 78, resulting from removal of the segment 70.

It should be appreciated that with the cover 10 oriented for mounting to a vertically oriented electrical box, as illustrated in FIG. 1, the frangible segment 70 in the side panel 44 will remain in place, such that a continuous water resistant seal will extend along the interlocked channels 56, 58 at the panels 44, 18 of the lid and base. The frangible segment 70 in the bottom panel 48 will be broken away to create a portal passageway for electric cord access to an electrical device if the cover is to be employed as an in use cover. In such event the dripstone canopy 72 will effectively shield the portal passageway from the entrance of water or which drips down from the top and front panels 42, 40. Further, because the dripstone canopy extends along the sides of the portal passageway, the portal passageway is shielded from the entrance of water or snow which may be blown by wind gusts or the like.

In the event the cover 10 is mounted in a horizontally oriented position to an electrical box, the panel 48 becomes a left side panel and the hinge pin 28 will extend through an alternate pair of hinge knuckles 80, 82, such that the panel 44 becomes a bottom panel, the panels 48 and 42 become side panels and the panel 46 becomes a top panel.

The frangible segment 70 of the panel 48 will remain in place, such that a continuous water resistant seal will extend along the interlocked channels 56, 58 at the panels 48, 20 of the lid and base. The frangible segment 70 in the panel 44 may be broken away to create a portal passageway for electric cord access to an electrical device, in the event the cover 10 is to be employed as an in use cover.

Thus is will be seen that there is provided an in use cover for outdoor electrical devices which achieves the various aspects, features and considerations of the present invention and which is well suited to meet the conditions of practical usage.

In the figures of this application, in some instances, a plurality of elements may be shown as illustrative of a particular element, and a single element may be shown as illustrative of a plurality of a particular elements. Showing a plurality of a particular element is not intended to imply that a system or method implemented in accordance with the invention must comprise more than one of that element or step, nor is it intended by illustrating a single element that the invention is limited to embodiments having only a single one of that respective element. Those skilled in the art will recognize that the numbers of a particular element shown in a drawing can, in at least some instances, be selected to accommodate the particular user needs.

The particular combinations of elements and features in the above-detailed embodiment are exemplary only; the interchanging and substitution of these teachings with other teachings in this application are also expressly contemplated. As those skilled in the art will recognize, variations, modifications, and other implementations of what is described herein can occur to those of ordinary skill in the art without departing from the spirit and the scope of the invention as claimed.

Further, in describing the invention and in illustrating embodiments of the invention in the figures, specific terminology, numbers, dimensions, materials. etc., are used for the sake of clarity. However the invention is not limited to the specific terms, numbers, dimensions, materials. etc. so selected, and each specific term, number, dimension, material, etc., at least includes all technical and functional equivalents that operate in a similar manner to accomplish a similar purpose. Use of a given word, phrase, number, dimension, material, language terminology, product brand, etc. is intended to include all grammatical, literal, scientific, technical, and functional equivalents. The terminology used herein is for the purpose of description and not limitation.

Having described the preferred embodiment of the invention, it will now become apparent to one of ordinary skill in the art that other embodiments incorporating the concept may be used. Moreover, those of ordinary skill in the art will appreciate that the embodiment of the invention described herein can be modified to accommodate and/or comply with changes and improvements in the applicable technology and standards referred to herein.

For example, the technology can be implemented in many other, different, forms, and in many different environments, and the technology disclosed herein can be used in combination with other technologies. Variations, modifications, and other implementations of what is described herein can occur to those of ordinary skill in the art without departing from the spirit and the scope of the invention as claimed. It is felt therefore that these embodiments should not be limited to the disclosed embodiment but rather should be limited only by the spirit and scope of the appended claims.

As various possible further embodiments might be made of the present invention and various changes might be made in the illustrative embodiments above set forth without departing from the spirit of the invention, it is to be understood that all matter herein described or shown in the accompanying drawings is to be interpreted as illustrative and not in a limited sense.

Having thus described the invention, there is claimed as new and desired to be secured by Letters Patent:

1. An in use cover for an outdoor electrical device comprising a lid hinged to a base, the lid having at least one panel including a frangible segment configured to be removed to provide a portal into an interior of the cover for an electric cord to access an electrical device, the at least one panel having an arched flange extending around at least a portion of the frangible segment, the lid further including a laterally projecting peripheral flange, a peripheral skirt extending from the peripheral flange and an internal rail extending parallel to the peripheral skirt, a lid channel extending between the peripheral skirt and the internal rail and the base including an outer base rail and an inner base rail, a base peripheral channel extending between the outer base rail and the inner base rail, the internal rail being seated in the base peripheral channel and the outer base rail being seated in the lid channel when the lid is closed, a portion of the peripheral flange extending through the frangible segment, the portion of the peripheral flange extending through the frangible segment having cut away notches leaving open spaces extending completely through the portion of the peripheral flange, the open spaces facilitating removal of the frangible segment, a portion of the at least one panel extending through the frangible segment, said portion of the at least one panel including a portion of the internal rail, said portion of the at least one panel being continuous with the at least one panel, whereby water which may pass through the open spaces will be blocked from passing into the interior of the cover.

2. The in use cover for an outdoor electrical device in accordance with claim 1 wherein a portion of the lid channel extends through the frangible segment.

3. The in use cover for an outdoor electrical device in accordance with claim 1 wherein the arched flange is continuous with the peripheral flange.

4. The in use cover for an outdoor electrical device in accordance with claim 1 wherein the lid is molded of thermoplastic having a substantially uniform thickness, the thickness of the frangible segment being less than that of the remainder of the lid.

5. The in use cover for an outdoor electrical device in accordance with claim 1 wherein the portion of the peripheral flange includes lateral ends, the open spaces being positioned at the lateral ends.

6. The in use cover for an outdoor electrical device in accordance with claim 1 wherein a portion of the peripheral skirt extends through the frangible segment, the portion of the peripheral skirt extending through the frangible segment having cut away notches leaving open spaces extending completely through the peripheral skirt to facilitate removal of the frangible segment.

7. The in use cover for an outdoor electrical device in accordance with claim 6 wherein the portion of the peripheral flange and the portion of the peripheral skirt include lateral ends, the open spaces being positioned at the lateral ends.

8. An in use cover for an outdoor electrical device comprising a lid hinged to a base, the lid having at least one panel including a frangible segment configured to be removed to provide a portal into an interior of the cover for an electric cord to access an portion of the frangible segment, the lid further including a peripheral flange, a peripheral skirt extending from the peripheral flange and an internal rail extending parallel to the peripheral skirt, a lid channel extending between the peripheral skirt and the internal rail and the base including a peripheral channel, the channels being interlocked when the lid is closed, a portion of the peripheral skirt extending through the frangible segment, the portion of the peripheral skirt extending through the frangible segment having cut away notches leaving open spaces extending completely through the portion of the peripheral skirt to facilitate removal of the frangible segment, a portion of the at least one panel extending through the frangible segment, said portion of the at least one panel including a portion of the internal rail, said portion of the at least one panel being continuous with the at least one panel, whereby water which may pass through the open spaces will be blocked from passing into the interior of the cover.

9. The in use cover for an outdoor electrical device in accordance with claim 8 wherein the portion of the peripheral skirt includes lateral ends, the open spaces being positioned at the lateral ends.

10. The in use cover for an outdoor electrical device in accordance with claim 8 wherein the lid is molded of thermoplastic having a substantially uniform thickness, the thickness of the frangible segment being less than that of the remainder of the lid to facilitate removal of the frangible segment.

* * * * *